United States Patent
Ohura

(10) Patent No.: US 6,661,143 B1
(45) Date of Patent: Dec. 9, 2003

(54) BEARING UNIT WITH MAGNETIC BEARING PROTECTION UPON ROTATION STOPPAGE

(75) Inventor: Yukio Ohura, Fujisawa (JP)

(73) Assignee: NSK Ltd., Tokyo (JP)

( * ) Notice: Subject to any disclaimer, the term of this patent is extended or adjusted under 35 U.S.C. 154(b) by 0 days.

(21) Appl. No.: 09/545,520

(22) Filed: Apr. 7, 2000

(30) Foreign Application Priority Data

Apr. 9, 1999 (JP) .......................................... H11-102888

(51) Int. Cl.⁷ ................................................. H02K 7/09
(52) U.S. Cl. ...................... 310/90.5; 384/504; 384/512; 310/90
(58) Field of Search .................. 310/90.5, 90; 384/490, 384/504, 512, 513

(56) References Cited

U.S. PATENT DOCUMENTS

| | | | | |
|---|---|---|---|---|
| 967,520 A | * | 8/1910 | Hess | 384/512 |
| 1,199,577 A | * | 9/1916 | Langharr | 384/512 |
| 1,379,945 A | * | 5/1921 | Teetsow | 384/512 |
| 1,467,378 A | * | 9/1923 | Hanson | 384/512 |
| 1,589,415 A | * | 6/1926 | Nides et al. | 384/512 |
| 1,964,420 A | * | 6/1934 | Baninger | 384/512 |
| 2,001,566 A | * | 5/1935 | Brunner | 384/512 |
| 2,355,723 A | * | 8/1944 | Griffin | 384/512 |
| 2,654,645 A | * | 10/1953 | Ruist | 384/512 |
| 2,692,805 A | * | 10/1954 | Maxwell | 384/512 |
| 2,969,680 A | * | 1/1961 | Linn et al. | 310/90.5 |
| 3,068,480 A | * | 12/1962 | Fisher et al. | 384/512 |
| 3,651,550 A | * | 3/1972 | Bennett | 29/148.4 A |
| 4,091,687 A | * | 5/1978 | Meinke et al. | 74/574 |
| 4,629,261 A | * | 12/1986 | Eiermann et al. | 310/90.5 |
| 5,310,268 A | * | 5/1994 | Schlereth | 384/537 |
| 5,739,607 A | * | 4/1998 | Wood, III | 310/90.5 |
| 5,747,907 A | * | 5/1998 | Miller | 310/90.5 |

FOREIGN PATENT DOCUMENTS

| | | |
|---|---|---|
| JP | 11-101236 | 4/1999 |
| JP | 11-257353 | 9/1999 |

\* cited by examiner

*Primary Examiner*—Dang Le
(74) *Attorney, Agent, or Firm*—Crowell & Moring LLP

(57) ABSTRACT

Of a pair of rolling bearings provided for protection of magnetic bearings which support a rotatable shaft in a non-contact condition, such that the rolling bearings for protection are arranged together with the magnetic bearings, and used for supporting the rotatable shaft upon rotation stoppage, one of the rolling bearings for protection is provided on the side where thrust load is received or on the side where positioning in the axial direction is carried out, and comprises a double row, angular ball bearing which has inner and outer races one of which is installed on the rotatable shaft side and of an integral type.

3 Claims, 3 Drawing Sheets

BEARING UNIT WITH MAGNETIC BEARING PROTECTION UPON ROTATION STOPPAGE

FIELD OF THE INVENTION

The present invention relates to a rolling bearing for protection of a magnetic bearing.

BACKGROUND OF THE INVENTION

A magnetic bearing is used to support in a noncontact state a rotatable shaft of an apparatus such as turbo molecular pump, machine tool, rotating at a high speed, and a rolling beading is used together with the magnetic bearing such that upon the stoppage in function or the magnetic bearing, the rotatable shaft is supported by the rolling bearing.

Conventionally known as such a rolling bearing for protection is for example a structure arranged in the main body of a turbo molecular pump together with magnetic bearings as shown in FIG. 3, where air intake and exhaust are shown by arrows.

The turbo molecular pump has a rotor 3 of the integral type wherein a rotary blade 1 is made integral with a rotatable shaft 2 such that the rotary blade 1 rotates at a high revolution of several ten thousands rpm which produces a peripheral velocity corresponding to the kinetic speed of gas molecules. The turbo molecular pump further has a stationary blade 4, corresponding to the rotary blade 1, which is fixed to the inner wall of a stationary portion or housing 5.

A pair of radial magnetic bearings 7, 8 are provided such that a drive motor 6 is arranged between the radial magnetic bearings 7, 8. The rotatable shaft 2 is rotated by the drive motor 6 and supported in a noncontact state in a radial direction with reference to the stationary portion by the magnetic force of the pair of radial magnetic bearings 7, 8, and in a floating state in an axial direction by the magnetic force of a thrust magnetic bearing 9 at a lower end portion.

However, when it experiences any abnormal accident for example power supply interruption, the magnetic bearings 7, 8, 9 lose their function, so that they may be brought into contact with the rotatable shaft which still rotates at a high speed. It will cause any damages in the magnetic bearings 7, 8, 9. In order to avoid this, a pair of rolling bearings 10, 11 are additionally provided for protection at upper and lower positions.

In the protection bearings 10, 11, clearances between their inner ring and the rotatable shaft 2 are provided, such that the clearances are sized usually in the order of $\frac{1}{10}$ mm, which are smaller than the clearances of the radial magnetic bearings 7, 8, 9. In the state where the magnetic bearings function in a normal condition, the rotatable shaft 2 never comes into contact with the inner ring of the protection bearings 10, 11.

When the magnetic bearings lose their function, the protection bearings 10, 11 come into contact with the rotatable shaft 2 which rotates at a high speed so as to receive the rotatable shalt 2 for stopping, which is referred to as "touch-down".

Conventionally used on the thrust load side or for positioning in the axial direction is a protection bearing as shown with reference numeral 11 in FIG. 3 which is a combination bearing comprising a pair of single row, angular ball bearings juxtaposed and used in a dry condition or solid lubrication condition.

When any abnormal state such as power supply interruption occurs, the protection bearing comes into contact with the rotatable shaft 2 rotating at the highest revolution, which causes sudden start of rotation in the protection bearing to rapidly increase the bearing temperature. This rapid temperature increase is outstanding particularly in the case of the turbo molecular pump used in vacuum where there is no cooling action of air convection.

In addition, when the protection bearing used is of a vertical type, whirling load is added thereto due to unbalance, and so the heat generation in the bearing is larger.

In addition, the temperature of the contact surfaces between the bearing balls and the races is higher at local spots, resulting in that plastic flow is easily caused under the contact surface pressure in hertz.

Particularly, the heat generation of the protection bearing causes increase in the load to the rolling members and reduces the radial or internal clearance between the inner race and the rolling members because the contact surface between the inner race of the bearing and the rotatable shaft is smaller than the contact surface between the outer race and the housing so that the temperature of the inner race is higher than that of the outer race. Consequently, the inner race side is subjected to a larger compression stress. On the other hand, the outer race side is subjected to thermal expansion force.

The clearance between the outer race and the housing is sized in a micron order, and so after the temperature on the outer race side becomes high in a degree, there is no clearance between the housing and the outer race, so that the outer race does not expand any more.

On the other hand, since the clearance between the inner race and the rotatable shaft is sized in a order of $\frac{1}{10}$ mm, it can be easily shrunk.

Supposed that a thrust load Fa is applied downward to the inner race 13 from the rotatable shaft 2 in the protection bearing 11 comprising a pair of single row, angular ball bearings as shown in FIG. 4, and that the thrust load Fa is received by the housing 5 through the outer race 12, such that the load Q, that is compression force, applied to the inner race 13 from the rolling members 14 becomes larger so as to interrupt the expansion force of the inner race 13 due to temperature increase, the inner race 13 is partially yielded. This is advanced because the yield stress decreases due to temperature increase.

As a result, even after the rotation is stopped, the inner race 13, now under the room temperature, is kept shrunk and not restored to its original state. Accordingly, the internal clearances in the radial and axial directions in the bearing are kept larger, and not restored to their original state. This permanent shrinkage is advanced because the plastic flow due to the rolling contact stress on the surface layer portion of the raceways is produced.

SUMMARY OF THE INVENTION

An objective of the present invention is to provide a rolling bearing for protection of the magnetic bearing wherein one of the outer and inner races of the rolling bearing is used on the rotatable shaft side such that it is not easily subjected to the yield stress even if a larger load Q from the rolling members between the outer and inner races is applied to the one race upon touch-down, so that the internal clearances in the rolling bearing for protection can be prevented from increasing after it is restored to the room temperature.

DETAILED DESCRIPTION OF THE INVENTION

In order to achieve the objective as mentioned above, in an embodiment of the present invention, a rolling bearing is provided for protection of a magnetic bearing which supports a rotatable shaft in a non-contact condition, such that the rolling bearing for protection is arranged together with the magnetic bearing, and used for supporting the rotatable shaft upon rotation stoppage. The rolling bearing for protection comprises a double row, angular ball bearing which is provided on the side where thrust load is received or on the side where positioning in the axial direction is carried out, and which has inner and outer races one of which is installed on the rotatable shaft side and of an integral type. The term "integral" means a single body, for example, like a double row race.

Figure 3:
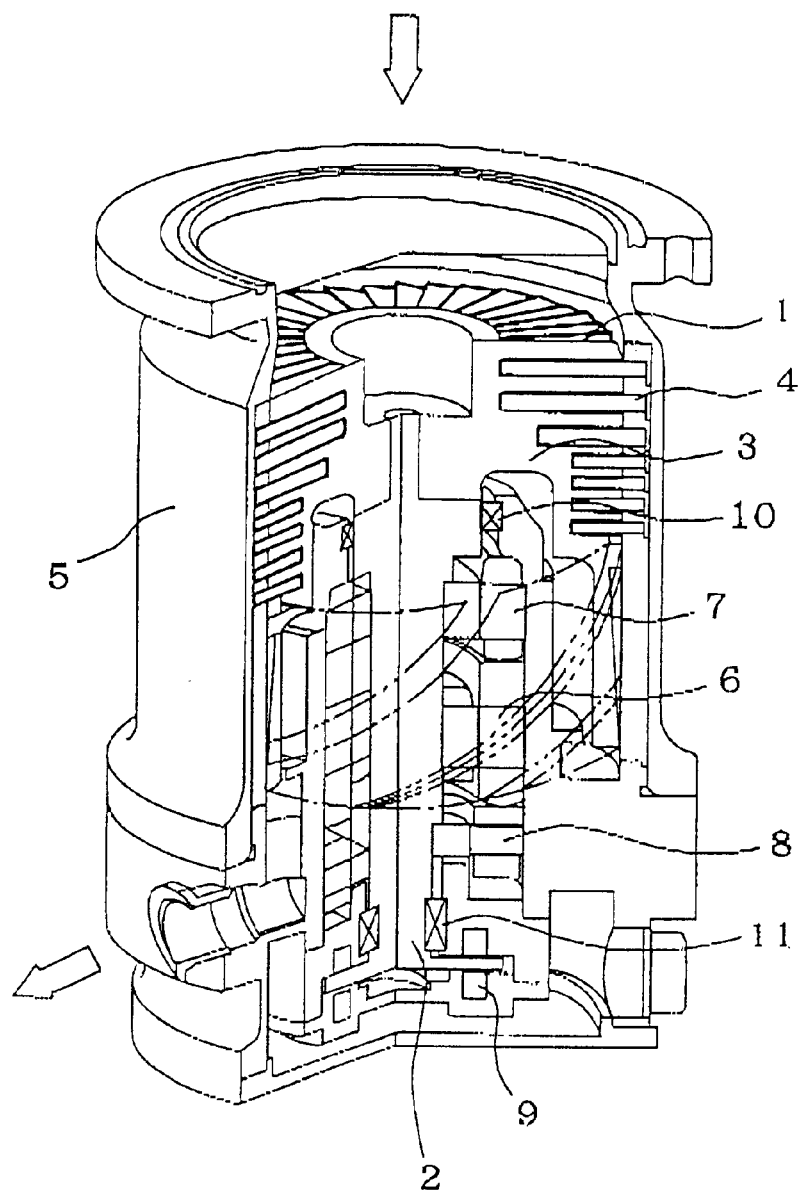
FIG. 3 is a partly cut-away, perspective view of a turbo molecular pump having a protection bearing installed therein.

In stead of the conventional combination protection bearing comprising a pair of single-row angular ball bearings as shown in FIG. 3, a structure is used wherein a double-row angular ball bearing is used for the protection bearing, where one of the races is installed on the rotatable shalt side and of an integral type. The rigidity of the one race of the integral type is high, which leads to small deformation amount, and to small internal stress in the inner race. Therefore, even if the load (Q) from the rolling members between the inner and outer races is large, the one race is not easily subjected to the yield stress, and the internal clearances when it is restored to the room temperature can be prevented from increasing.

Figure 1:
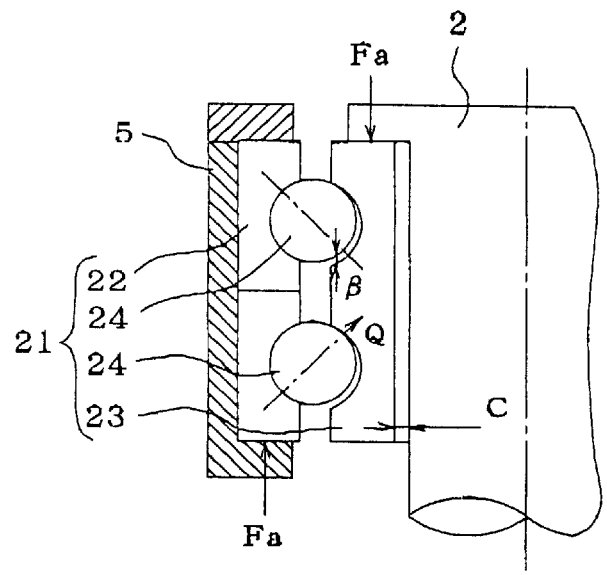
FIG. 1 is a cross sectional view of a main part of an embodiment of the present invention.
Figure 4:
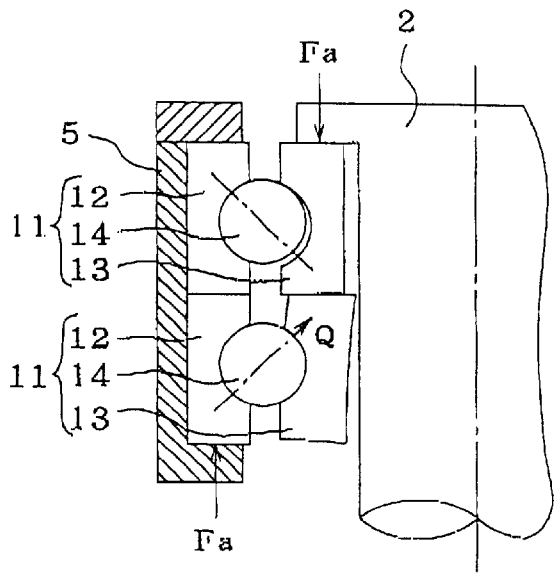
FIG. 4 is a cross sectional view of a main part of a conventional protection bearing.

An embodiment of the present invention is further explained referring to the attached drawings. FIG. 1 is a cross sectional view of the protection bearing according to the present invention, corresponding to the conventional structure of FIG. 4 on the side where thrust load is received or on the side where positioning in the axial direction is carried out. Like numbers are used for like members. With the protection bearing 21, only the inner race 23 comprises a double row (inward facing) of angular ball bearing of the integral type. Specifically, the outer race 22 is of a split type where two rings having the same size as the outer race of a single row angular ball bearing as shown in FIG. 4 are combined.

On the other hand, the inner race 23 is of a double row, integral type where a pair of raceways are provided for the rolling members 24 in two rows.

The outer race 22 of the split type is fitted into the inner peripheral surface of the housing 5 of a turbo molecular pump. The clearance between the outer race 22 and the housing 5 is sized only in a micron order, but the outer race 22 of the split type is easily assembled as in the conventional structure. The inner race 23 of the integral type is mounted to the rotatable shaft 2, rotating at a high speed of e.g. 30,000 to 40,000 rpm, with a clearance C (in the order of $\frac{1}{10}$ mm) for play. Upon touch-down, that is when the rotor 3 of the turbo molecular pump is halted due to abnormal condition such as power supply interruption, since the magnetic bearings (see FIG. 3) are not operated, the rotatable shaft 2 is not supported by them, and comes into contact with the protection bearing 23 and received by it. Consequently, it would be avoided that the rotatable shaft 2 comes into contact with the magnetic bearings 7, 8 (see FIG. 3) to cause any damages on these magnetic bearings.

The following is a study on the movement of the inner race 23 upon touch-down, comparing with the conventional structure.

There are two ways of application of the load Q onto the inner race side from the rolling members.

(1) the case where the load Q is applied to the inner race only from one row of the double rows of rolling members The protection bearing 21 of this case is of a tandem type, and the axial clearance β between the rolling members 24 in one row (upper row) and the raceway surface is still kept positive. In other words, little time has elapsed after the rotatable shaft 2 comes into contact with the inner race 23.

In this case, with the conventional inner race of the split type as shown in FIG. 4, the load Q is applied to only the inner race 13 of the lower, single row, angular bearing, and the inner race 13 is easily deformed. On the other hand, with the structure of the present invention, as shown in FIG. 1, the load Q only from the lower row of rolling members 24 is applied to the inner race 23 of the integral type, so that the rigidity of the inner race is about twice, and it is hardly deformed.

(2) the case where the load Q is applied from both of the pair of rows of rolling members The protection bearing 21 is either of the lateral type or of the vertical type. The axial clearance β has diapeared after a long time has elapsed from touch-down.

Figure 2:
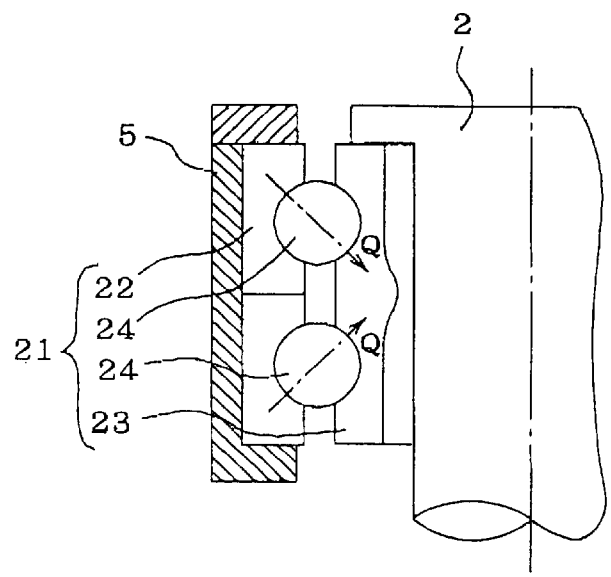
FIG. 2 is a cross sectional view of the main part of the embodiment of FIG. 1 to explain the action.
Figure 5:
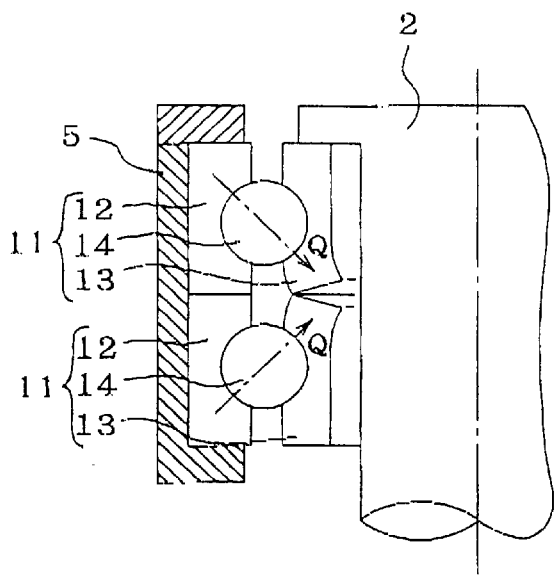
FIG. 5 is a cross sectional view of the main part of FIG. 4 to explain the action.

In this case, with the inner race of the conventional split type, as shown in FIG. 5, the load Q is applied to both of the inner races 13 of the upper and lower, single row angular ball bearings, and the inner races 13 are largely deformed. On the other hand, with the present invention, as shown in FIG. 2, the inner race 23 is of the integral type and its rigidity is high. Therefore, it is hardly yielded.

Accordingly, with the rolling bearing for protection of the magnetic bearing in the present invention, the internal clearances in the protection bearing are effectively prevented from increasing when it is restored to the room temperature after touch-down, which is difficult in the conventional structure.

Incidentally, the above embodiment is explained with the case where the inner race 23 of the protection bearing mounted to the rotatable shaft 2 is of the integral type. However, when the touch-down is intended with a structure where the inner race 23 is mounted to a stationary portion with the outer race 22 mounted to the rotatable portion, the outer race is of the integral type.

As explained above, according to the present invention, since the race mounted to the rotatable shaft side in the protection bearing comprises a double row, angular ball bearing of an integral type, even if the load Q from the rolling members onto the race due to touch-down becomes large, the race is not easily subjected to yield stress, and so the internal clearances in the protection bearing are prevented from increasing after it is restored to the room temperature.

What is claimed is:

1. A bearing unit comprising a magnetic bearing which supports a rotatable shaft in a non-contact condition, and a rolling bearing which does not support the rotatable shaft while the magnetic bearing supports the rotatable shaft, wherein the rolling bearing is arranged to be connected in the axial direction to the rotatable shaft for supporting the rotatable shaft upon rotation stoppage, the rolling bearing comprising a double row, angular ball bearing and provided on the side where thrust load is received or on the side where positioning in the axial direction is carried out, the double row, angular ball bearing having inner and outer races and balls between the inner and outer races, and wherein one of the inner and outer races is an integral race installed on the side of the rotatable shaft with a radical clearance between the integral race and the shaft in the non-contact condition, the other of the inner and outer races being of a split type, and the integral race being supported only by the split-type races through the balls, whereby a large thrust load from the rotatable shaft is borne by the rolling bearing upon the rotation stoppage.

2. The bearing unit of claim 1, wherein the rotatable shaft has a flange to which one end of the integral race is abutted in the axial direction upon the rotation stoppage.

3. A bearing unit comprising a magnetic bearing which supports a rotatable shaft in a non-contact condition during operation, and a rolling bearing which is provided on either side of the magnetic bearing and arranged to be separated from the rotatable shaft while the magnetic bearing supports the rotatable shaft and to come into contact with the rotatable shaft for supporting the rotatable shaft when the magnetic bearing does not support the rotatable shaft, and a supporting member for supporting the rolling bearing, wherein the rolling bearing provided on the side with respect to the magnetic bearing where the thrust load is received or on the side with respect to the magnetic bearing where positioning in the axial direction is carried out comprises a double row, angular ball bearing for supporting the rotatable shaft against a thrust load upon rotation stoppage, and wherein the double row, angular ball bearing has inner and outer races and balls between the inner and outer races, such that one of the inner and outer races is an integral race installed on the side of the rotatable shaft with a radial clearance between the integral race and the shaft in the non-contact condition, the other of the inner and outer races being of a split type, and the integral race being supported only by the split-type races through the balls against the thrust load from the rotatable shaft when the rolling bearing comes into contact with the rotatable shaft while the other of the inner and outer races is securely supported by the supporting member.

* * * * *